US012072065B2

(12) United States Patent
Luong et al.

(10) Patent No.: US 12,072,065 B2
(45) Date of Patent: Aug. 27, 2024

(54) METHOD AND APPARATUS FOR VAPORIZING A LIQUID

(71) Applicant: L'Air Liquide, Société Anonyme pour l'Etude et l'Exploitation des Procédés Georges Claude, Paris (FR)

(72) Inventors: Aurelie Luong, Champigny-sur-Marne (FR); Bhadri Prasad, Maisons Laffitte (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 350 days.

(21) Appl. No.: 17/530,718

(22) Filed: Nov. 19, 2021

(65) Prior Publication Data

US 2022/0154885 A1 May 19, 2022

(30) Foreign Application Priority Data

Nov. 19, 2020 (FR) .................................. 2011856

(51) Int. Cl.
*F17C 7/04* (2006.01)

(52) U.S. Cl.
CPC .......... *F17C 7/04* (2013.01); *F17C 2221/033* (2013.01); *F17C 2250/0636* (2013.01); *F17C 2265/031* (2013.01)

(58) Field of Classification Search
CPC ................. F17C 7/04; F17C 2221/033; F17C 2250/0636; F17C 2265/031
See application file for complete search history.

(56) References Cited

U.S. PATENT DOCUMENTS

| | | | |
|---|---|---|---|
| 2011/0259010 | A1 | 10/2011 | Bronicki et al. |
| 2015/0168025 | A1 | 6/2015 | Briglia et al. |
| 2020/0191689 | A1 | 6/2020 | Le Bot et al. |

FOREIGN PATENT DOCUMENTS

| | | |
|---|---|---|
| DE | 10 2012 222082 | 6/2014 |
| EP | 2 060 752 | 5/2009 |
| WO | WO 2014 009641 | 1/2014 |
| WO | WO 2017 218322 | 12/2017 |
| WO | WO 2018 211230 | 11/2018 |

OTHER PUBLICATIONS

French Search Report for corresponding FR 2011856, Aug. 21, 2021.

*Primary Examiner* — Nael N Babaa
(74) *Attorney, Agent, or Firm* — Elwood L. Haynes

(57) ABSTRACT

In a method for vaporizing a liquid in a heat exchanger, a liquid vaporizes in the heat exchanger to form a gas which is sent to a user via a first pipe in normal operation, wherein if the rate of change of the rate of flow of liquid sent to the exchanger exceeds a threshold, the first pipe is closed and fluid, which may be gas vaporized in the heat exchanger and/or liquid not vaporized in the exchanger, is discharged into the atmosphere or to a flare stack through a second pipe and a valve, the opening of the valve being regulated by the fluid flow rate measured in the second pipe.

7 Claims, 2 Drawing Sheets

METHOD AND APPARATUS FOR VAPORIZING A LIQUID

CROSS REFERENCE TO RELATED APPLICATIONS

This application claims the benefit of priority under 35 U.S.C. § 119 (a) and (b) to French Patent Application No. 2011856, filed Nov. 19, 2020, the entire contents of which are incorporated herein by reference.

BACKGROUND

The present invention relates to a method for vaporizing a liquid, particularly for vaporizing methane or some other liquid that vaporizes at a temperature below 0° C.

In the case of vaporizing a cryogenic liquid in an exchanger, if the regulation of the vaporization is not sufficiently precise, the hot end of the exchanger may be weakened as a result of excessive cold, which may damage it.

SUMMARY

It is an object of this invention to reduce the risk of weakening by detecting deficiency of the regulation system and by modifying the regulation system in order to reduce the risk of weakening.

One subject of the invention provides a method for vaporizing a liquid in a heat exchanger in which a liquid vaporizes in the heat exchanger to form a gas which in normal operation is sent to a user through a first pipe, wherein if the rate of change of the rate of flow of liquid sent to the exchanger exceeds a threshold, the first pipe is closed and fluid, which may be gas vaporized in the heat exchanger and/or liquid not vaporized in the exchanger, is discharged into the atmosphere or to the flare stack through a second pipe and a valve, the opening of the valve being regulated by the fluid flow rate measured in the second pipe.

According to other optional aspects:

- if the rate of change of the rate of flow of liquid sent to the exchanger is below a threshold
  - i) vaporized liquid is sent to the user and/or
  - ii) vaporized liquid is discharged to the atmosphere or to the flare stack through the pipe and the valve, the opening of the valve being regulated by the pressure of the vaporized gas, which pressure is measured downstream of the heat exchanger.
- if the rate of change of the rate of flow of liquid sent to the exchanger exceeds a threshold, the opening of the valve is not regulated by the pressure of the vaporized gas, which pressure is measured downstream of the heat exchanger.
- the second pipe is closed during normal operation, for example by closing the valve.

Another aspect of the invention provides an apparatus for vaporizing a liquid comprising a heat exchanger in which a liquid vaporizes to form a gas, a first pipe for sending the gas formed to a user in normal operation, a second pipe connected to the heat exchanger to send gas vaporized in the heat exchanger and/or liquid not vaporized in the exchanger to the atmosphere or to a flare stack, a detector for detecting whether the rate of change of the rate of flow of liquid sent to the exchanger exceeds a threshold, first regulating means for regulating the opening of a valve in the second pipe according to the flow rate measured in the second pipe, second regulating means for regulating the opening of a valve in the second pipe according to the pressure of the gas formed downstream of the heat exchanger, and means allowing the valve to be connected selectively to the first and to the second regulating means.

According to other optional aspects:

- the means allowing the valve to be connected selectively to the first and to the second regulating means are suitable for connecting the valve to the first or second regulating means according to the rate of change of flow rate of the liquid entering the exchanger.
- the apparatus comprises an auxiliary valve connected in parallel with the valve in the second pipe.
- the apparatus comprises a flowmeter for measuring the flow rate in the second pipe and for opening the auxiliary valve according to this flow rate.
- the apparatus comprises a valve for opening the first pipe and means for opening this valve according to the pressure and/or the flow rate of vaporized gas.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

Figure 1:
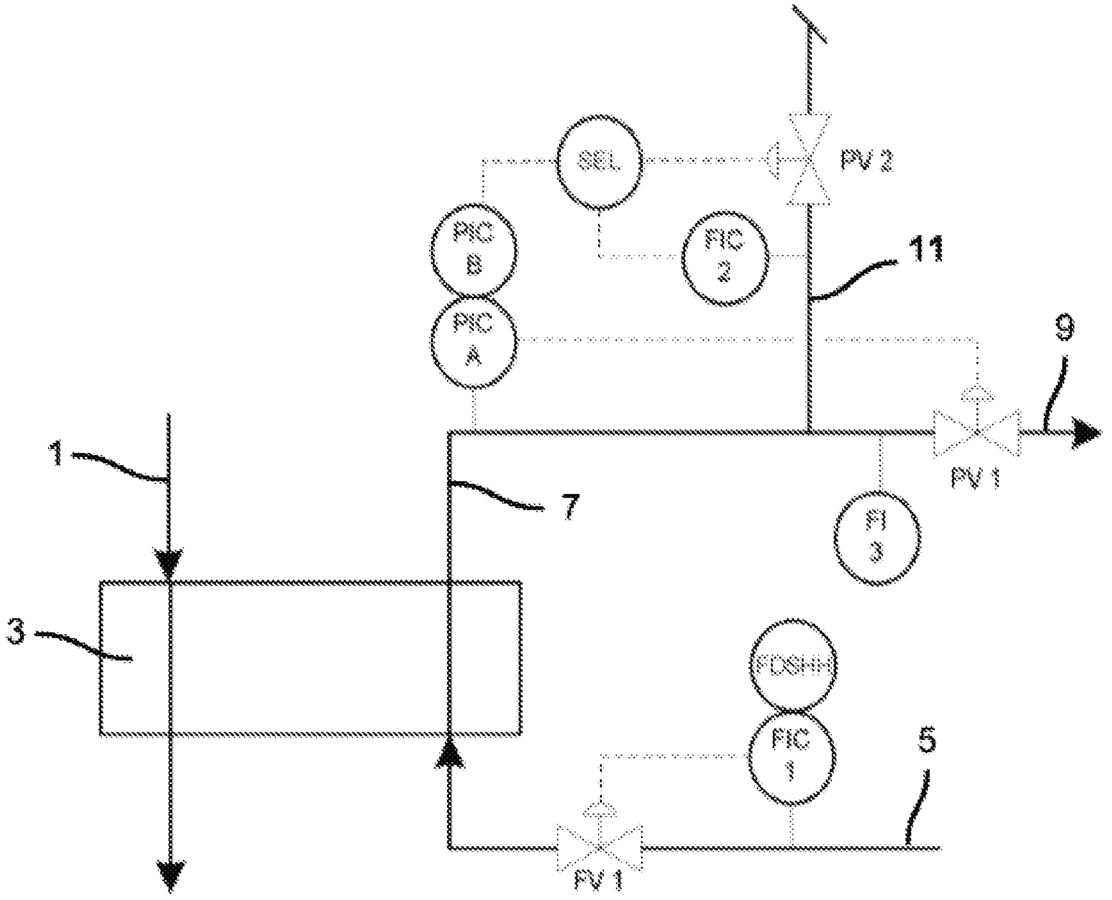
FIG. 1 illustrates a method for vaporizing liquid. A heat exchanger 3 allows a liquid 5 to be vaporized through counterflow exchange of heat with a fluid 1 The flow rate of the liquid 5 is regulated by the valve FV 1, controlled by FIC 1. The liquid 5 may be methane or any liquid that vaporizes at a temperature below 0° C. The liquid 5 vaporizes in the exchanger 3 to form the gas in the pipe 7.

The gas pipe 7 is connected to the pipes 9 and 11 that allow the gas to be sent to two different places: to a user in the case of the pipe 9, and to the atmosphere or to a flare stack in the case of the pipe 11. The pressure in the pipe 7 is regulated by the valve PV 1 controlled by the pressure controller PIC A.

In the event of poor operation of the valve FV 1 or flowmeter FI 1, it is possible to send the vaporized gas to the atmosphere or to a flare stack via the pipe 11 upstream of the valve PV 1 that regulates the pipe 7. In that case, the valve PV 2 on the pipe 11 is opened by the pressure controller PIC B, the setpoint of which is slightly higher than that of PIC A.

Optionally, a flowmeter FI 3 measures the gas flow rate in the pipe 9 to determine how much gas is sent to the user.

If the regulating system is deficient, a flow of liquid may reach the hot end of the exchanger 3, at the risk of weakening same. This arrival of liquid at the hot end may increase the pressure at the hot end of the exchanger 3, which means that the valves PV 1 and PV 2 open, thus increasing the risk of weakening through excessive cold.

Figure 2:
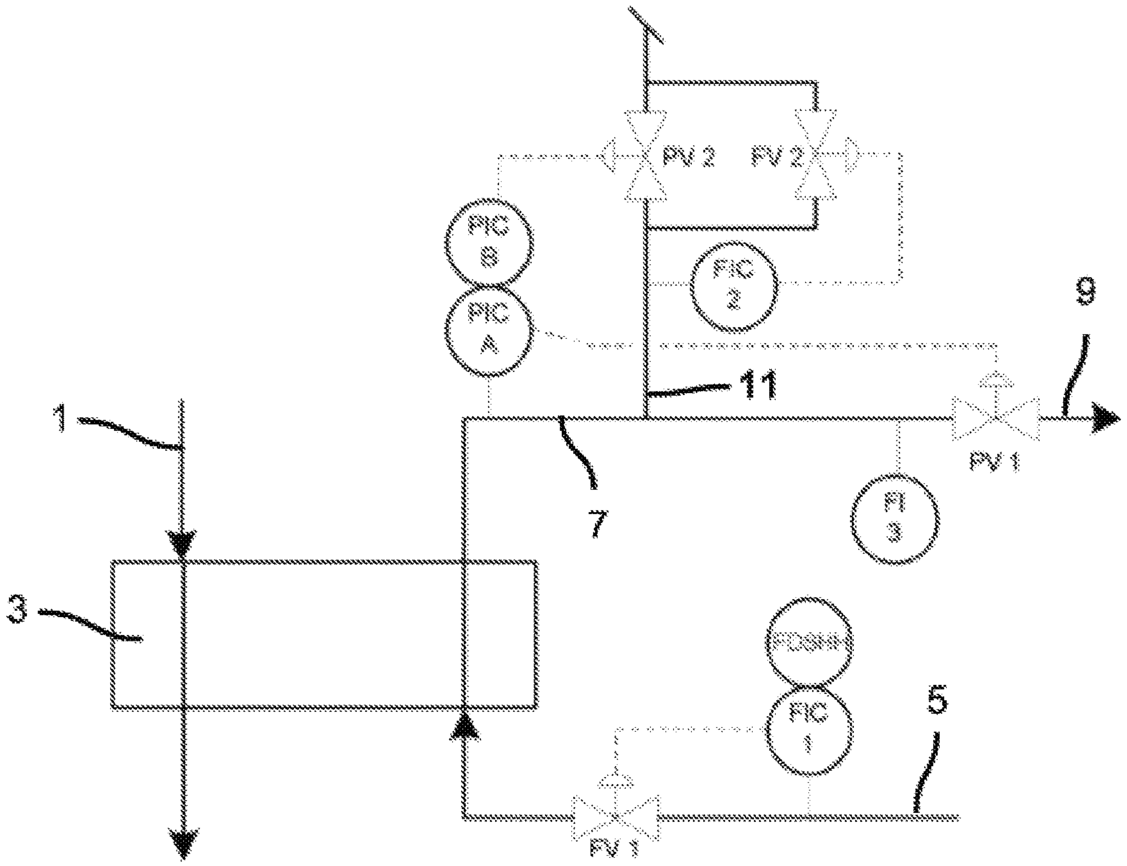
FIG. 2 shows a variant of FIG. 1.

FIG. 2 shows a variant of FIG. 1.

A heat exchanger 3 allows a liquid 5 to be vaporized through counterflow exchange of heat with a fluid 1. The flow rate of the liquid 5 is regulated by the valve FV 1, controlled by FIC 1. The liquid 5 may be methane or any liquid that vaporizes at a temperature below 0° C. The liquid 5 vaporizes in the exchanger 3 to form the gas in the pipe 7.

The gas pipe 7 is connected to the pipes 9 and 11 that allow the gas to be sent to two different places: to a user in the case of the pipe 9, and to the atmosphere or to the flare stack in the case of the pipe 11. The pressure in the pipe 7 is regulated by the valve PV 1 controlled by the pressure controller PIC A.

In the event of poor operation of the valve PV 1, it is possible to send the vaporized gas to the atmosphere or to the flare stack via the pipe 11 upstream of the valve PV 1 that regulates the pipe 7. In that case, in normal operation, the valve PV 2 on the pipe 11 is opened by the pressure controller PIC B, the setpoint of which is slightly higher than that of PIC A.

Optionally, a flowmeter FI 3 measures the gas flow rate in the pipe 9 to determine how much gas is sent to the user.

If the regulating system FIC 1 is deficient, the rate of change of the rate of flow of liquid 5 increases beyond a threshold. This change in rate beyond the threshold is detected by the detector FDSHH which is connected to the pipe for the liquid 5.

According to the invention, if a rate of change of flow rate 5 is observed, the pipe 9 is closed and the sending of fluid to the atmosphere or to the flare stack is regulated according to the flow rate of fluid in the pipe 11.

Once it has been observed that this rate of change is particularly high, the system may enact the following changes:

- the regulation system FIC 1 is switched over to manual mode and/or the PV input of the system FIC 1 is changed from an actual value to a moving average
- the valve PV 1 closes, preferably gently along a gradient, in order to reduce the flow sent to a user
- the valve PV 2 is controlled no longer by the pressure controller PIC B but by the flow rate controller FIC 2 connected to the pipe 11, preferably in such a way that only the flow rate controller FIC 2 operates the valve PV 2
- modifies the setpoint of the flow rate controller FIC 2 so that it becomes that of the flow rate controller FIC 1, so that the rate of flow passing through the pipe 11 corresponds to that of the pipe for liquid 5

Optionally, when the valve PV 1 is closed, its solenoid, if there is one, is also closed.

If the value of FI 3 is used in the calculations, its value is fixed at the last measured value and then reduced to 0 as the valve PV 1 closes.

As illustrated in the figure, it may be necessary to provide a valve FV 2 in parallel with the valve PV 2. Such is the case when the valve PV 2 would otherwise be too large to allow fine regulation of the flow passing through the exchanger 3. The valve FV 2 is sized to allow the nominal flow rate to pass.

In that case, the valve PV 2 is controlled by the pressure controller PIC B according to the pressure in the pipe 7, and the valve FV 2 is controlled by the flow rate controller FIC 2 according to the flow rate in the pipe 7 or 11.

If the rate of change of flow rate to a rate level with the threshold is detected by the detector FDSHH then, in this case, rather than the valve PV 2 being controlled by the FIC 2 instead of by the PIC B, the valve PV 2 will be closed and the valve FV 2 will be opened by the FIC 2, with a flow rate setpoint corresponding to that of FIC 1.

This principle may be applied whatever the mode via which the valve FV 1 is controlled. In the example, the flow rate controller FIC 1 is used but the valve on the pipe 5 may also or as an alternative be regulated according to the pressure or according to a level. It may be regulated manually. However, the presence of a flowmeter is needed in order to detect the poor operation of the vaporization by observing that the flow rate 5 is changing particularly rapidly.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for vaporizing a liquid in a heat exchanger in which a liquid vaporizes in the heat exchanger to form a gas which is sent to a user via a first pipe in normal operation, wherein if the rate of change of the rate of flow of liquid sent to the exchanger exceeds a threshold, the first pipe is closed and fluid is discharged into the atmosphere or to a flare stack through a second pipe and a valve, the opening of the valve being regulated by the fluid flow rate measured in the second pipe.

2. The method according to claim 1, wherein if the rate of change of the rate of flow of liquid sent to the exchanger is below a threshold i) vaporized liquid is sent to the user and/or ii) vaporized liquid is discharged to the atmosphere or to the flare stack through the second pipe and the valve, the opening of the valve being regulated by the pressure of the vaporized gas, which pressure is measured downstream of the heat exchanger.

3. The method according to claim 1, wherein, if the rate of change of the rate of flow of liquid sent to the exchanger exceeds a threshold, the opening of the valve is not regulated by the pressure of the vaporized gas, which pressure is measured downstream of the heat exchanger.

4. The method according to claim 1, wherein the second pipe is closed in normal operation.

5. An apparatus for vaporizing a liquid comprising:

- a heat exchanger fluidically connected to an inlet pipe configured to carry a liquid to be vaporized, and a first pipe configured to carry a vaporized liquid,
- a second pipe fluidically connected to the first pipe, and configured to send gas vaporized in the heat exchanger and/or liquid not vaporized in the heat exchanger to the atmosphere or to a flare stack,
- a first detector fluidically connected to the inlet pipe and configured to detect a rate of change of the rate of flow of liquid sent to the exchanger, and detect if this rate of flow exceeds a threshold,
- a second detector fluidically connected to the second pipe and configured to detect the flowrate in the second pipe,
- a flow rate controller fluidically connected to the second pipe and configured to regulate the opening of a valve in the second pipe according to the flow rate measured by the second detector,
- a pressure controller fluidically connected to the first pipe and configured to measure the pressure in the second pipe and to regulate the opening of the valve in the second pipe according to the measured pressure, and
- a selector functionally connected to the valve and configured to allow the valve to be connected selectively to the flow rate controller and to the pressure controller.

6. The apparatus according to claim 5, wherein the selector is configured to connect the valve to the flow rate controller or the pressure controller according to the rate of change of flow rate of the liquid entering the exchanger.

7. The apparatus according to claim 5, further comprising an auxiliary valve connected in parallel with the valve in the second pipe.

* * * * *